United States Patent [19]

Bates

[11] 4,136,840

[45] Jan. 30, 1979

[54] CORD TAKE-UP REEL FOR AN ELECTRIC LAWN MOWER

[76] Inventor: Charles A. Bates, 5555 SE. Salmon, Portland, Oreg. 97215

[21] Appl. No.: 871,707

[22] Filed: Jan. 23, 1978

[51] Int. Cl.² .............................................. B65H 17/46
[52] U.S. Cl. ............................ 242/86.5 R; 191/12.2 R
[58] Field of Search ............................ 242/86.5 R, 77; 191/12.2 A, 12.2 R; 56/320.1, 320.2

[56] References Cited

U.S. PATENT DOCUMENTS

| | | | |
|---|---|---|---|
| 1,469,603 | 10/1923 | Peters | 191/12.2 R |
| 1,567,055 | 12/1925 | Huff | 242/77 |
| 2,720,560 | 10/1955 | Funk | 191/12.2 R |
| 2,728,182 | 12/1955 | Fulton | 191/12.2 R |

Primary Examiner—Edward J. McCarthy
Attorney, Agent, or Firm—Kolisch, Hartwell, Dickinson & Stuart

[57] ABSTRACT

A cord take-up reel for use on an electric lawn mower. The reel is telescopically constructed to permit its axial dimension to be adjusted for mounting between a pair of opposing mower handles. A pair of shafts extending outwardly from opposing sides of the reel are detachably and rotatably mounted in brackets held on the opposing mower handles. A crank pivotally attached to one of the reel shafts is positionable between a winding position and a stowed position, the motion of the crank in its stowed position being limited by a cradling member attached to the adjacent bracket.

7 Claims, 5 Drawing Figures

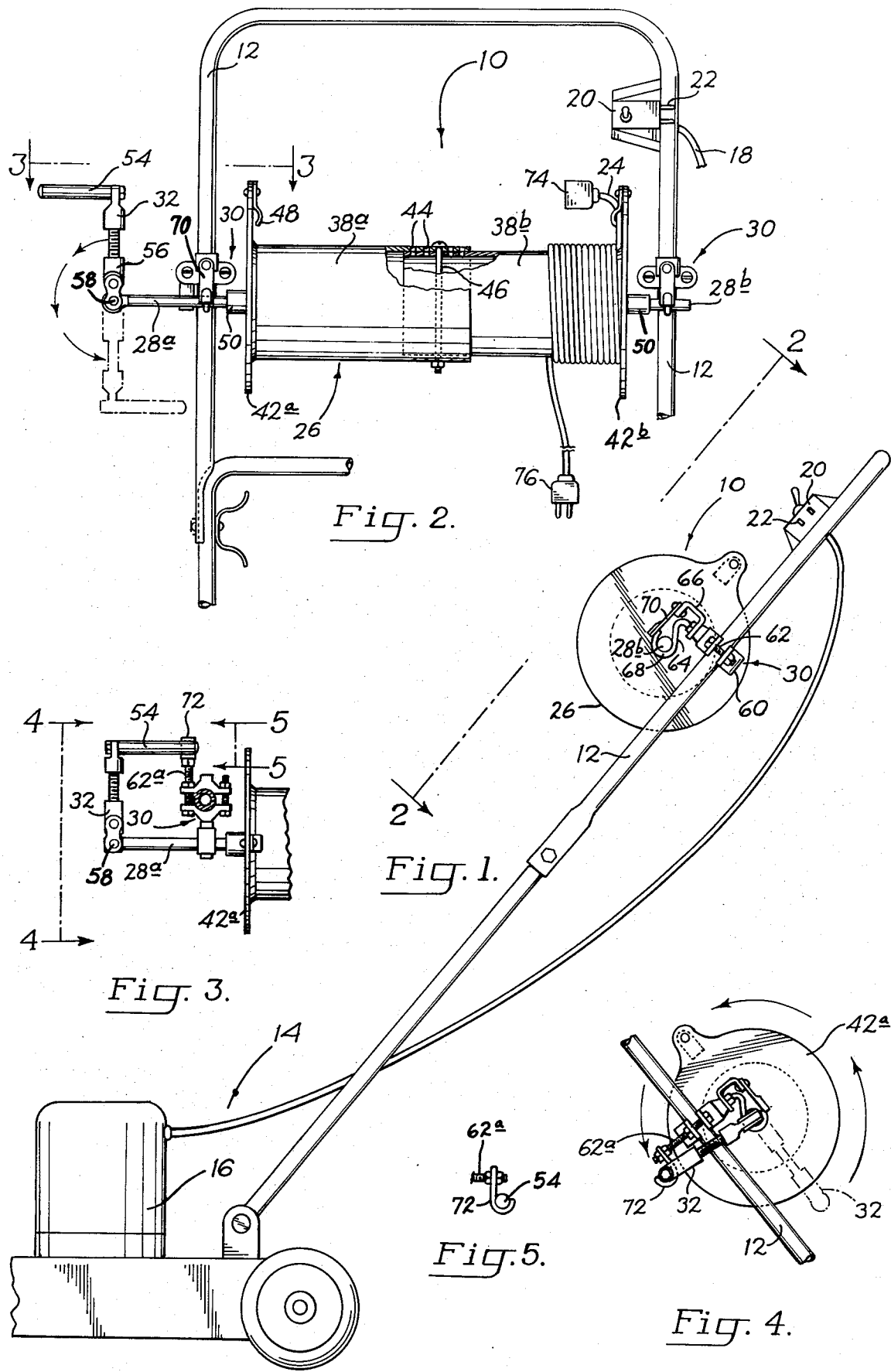

# CORD TAKE-UP REEL FOR AN ELECTRIC LAWN MOWER

BACKGROUND AND SUMMARY

The following invention relates to reel devices for electric cords, and more particularly, to such devices designed for use with electric lawn mowers.

Electrically powered lawn mowers are generally lighter, quieter, less expensive, and freer of maintenance problems than mowers powered by internal combustion engines. However, electric mowers have been limited in commercial appeal because of the inconvenience associated with the power cord connecting the mower and a distant electrical outlet.

Although such inconvenience associated with a connecting electric cord cannot be completely eliminated, it can be substantially reduced by providing a manually-operated reel by which the operator can pay out a fixed minimum length of electric cord, and easily rewind this length of cord after mower use. In order that such a reel can be adapted for use with a variety of pre-existing electric mowers, it must be adjustable to fit various types and sizes of pre-existing mowers.

It is, therefore, a primary object of the present invention to provide a manually-operable take-up reel which is easily and detachably mounted on pre-existing lawn mowers, having various distances spaced between their elongate handles.

It is a further object of the invention to provide a take-up reel having a manual crank which is stowable out of the way of the operator when not in use.

It is yet another object of the invention to provide a take-up reel for a lawn mower wherein the crank, in its stowed position, has limited movement, limiting the paying out of electrical cord from the reel.

To this end, there is provided a take-up reel comprising a telescopically constructed spool having at each spool end a shaft extending upwardly therefrom along the rotational axis of the spool. The telescopic construction permits the take-up reel to be mounted on electric mowers having various distances spaced between their elongate handles. The two shafts are detachably and rotatably supported in opposing brackets attached to the mower handles. Each bracket includes a pivotally mounted lock plate positionable to secure the associated shafts to the bracket. The reel is manually operated by a crank attached to one of the shafts. When not in use, the crank can be moved to a stowed position, wherein the movement of the reel is limited to prevent the paying out of electric cord.

These and other objects and features of the present invention will now be described more fully with reference to the following detailed description of the invention and the accompanying drawings.

BRIEF DESCRIPTION OF THE DRAWINGS

FIG. 1 is a side elevation view of a conventional electric lawn mower to which a take-up reel according to the present invention is attached;

FIG. 2 is a plan view of the take-up reel of the present invention shown attached to opposing mower handles as seen along line 2—2 of FIG. 1;

FIG. 3 is a fragmentary plan view of the take-up reel taken along line 3—3 of FIG. 2, with the crank in its stowed position and rotatably positioned to engage the cradling member;

FIG. 4 is a side elevation view of the take-up reel taken along line 4—4 of FIG. 3; and FIG. 5 is a side elevation view of the crank handle and cradling member taken generally along line 5—5 of FIG. 3.

DETAILED DESCRIPTION OF PREFERRED EMBODIMENT

Referring now to FIGS. 1 and 2, there is shown at 10 the take-up reel of the present invention mounted between a pair of elongate, laterally disposed handles 12 of a conventional electrically powered lawn mower 14. Mower 14 includes an electric motor contained within housing 16, and a mower cord 18 connecting the motor with a handle switch 20. Handle switch 20 provides a conventional plug 22 for electrical connection to a conventional extension cord 24.

The reel generally comprises a telescopically-constructed spool 26 having a pair of opposing shafts 28a and 28b extending outwardly therefrom along the rotational axis of the spool. These shafts are detachably and rotatably supported in brackets 30, each bracket being attached to an opposing mower handle 12. A crank 32 pivotally attached to shaft 28a is used in rotating spool 26, thus to pay out or take up cord 24 wound thereon.

As best seen in FIG. 2, spool 26 comprises a pair of telescopically arranged spool sections 38a and 38b, each section being formed as a cylindrical tube. Attached to the outer end of each section is a spool plate, such as plates 42a and 42b, respectively. Section 38a is dimensioned to slidably receive section 38b. The inner end region of each section is provided with diametrically spaced holes 44 which may be mutually aligned at a plurality of section axial positions. A conventional nut and bolt arrangement 46 extending through the aligned holes in both sections is used to maintain the desired axial spacing between opposing spool plates 42a and 42b.

Attached to the peripheral inwardly-facing surface of each spool plate is a cord clip 48 for engaging one of the associated ends of cord 24. Attached to the center of the outwardly-facing surface of each spool plate is a shaft mounting base 50 for holding securely therein by conventional means, one of the shafts 28a or 28b.

Crank 32 includes a crank handle 54 attached at one end and a lug 56 attached at its other end. Lug 56 is adapted to receive the end of shaft 28a, and be pivotally secured thereto by a nut and bolt 58. Thus mounted, crank 32 is swingable between a winding position in which handle 54 is outwardly facing (solid line, FIG. 2) and a stowed position in which handle 54 is inwardly facing (dotted line, FIG. 2).

As best seen in FIGS. 1 and 3, each bracket 30 includes a conventional bar clamp 60 attachable to the associated handle by nut and bolt 62. Securely attached to the top portion of each clamp is a metal loop member 64 and a U-shaped bracket 66. The end portion of member 64 is shaped to provide a semicircular recess 68 for rotatably receiving therein the associated shaft 28a or 28b. Pivotally attached to an upper part of bracket 66 is a locking plate 70 which may be manually positioned between a closed position, wherein the shaft is locked within recess 68, as shown in the figures, and an open position, wherein plate 70 is swung away to allow the associated shaft to be inserted into or removed from the recess.

The clamp 30 adjacent crank 32 is additionally provided with crank engaging means for limiting the move-` ment of the crank in its stowed position. As seen in FIGS. 3 and 4, the crank engaging means includes a cradling member 72 secured to the lower portion of clamp 30 by an extended bolt and nut arrangement 62a. When crank 32 in its stowed position is turned in a couterclockwise direction (as viewed in FIG. 4), the crank handle comes to rest in the cradling member 72, thus limiting the rotation of the reel in the counterclockwise direction.

To mount spool 26 on the mower handles, the axial spacing between opposing plates 42a and 42b is suitably adjusted, as described above. The two locking plates are then moved to their open positions, and spool shafts 28a and 28b placed in associated recesses 70. The rotatably mounted shaft is locked in the brackets by swinging the locking plates to their closed positions.

To take up electric cord 24 onto the spool, the cord outlet end 74 is fastened to one of clamps 48, and the crank, in its winding position, is rotated in the clockwise direction (as viewed in FIG. 4) until the desired amount of cord has been wound onto the spool. When the mower is not in use, it is customary to completely wind up the cord and secure cord plug 76 in the other clip 48.

When the mower is to be used, a desired minimum length of cord 24 is payed out by unwinding the reel, as above. Then crank 32 is swiveled to its stowed position and the reel backwound until handle 54 is received in cradling member 72, at which point further unwinding of the reel is prevented. The mower is energized by engaging cord outlet 74 with switch plug 22 and cord plug 76 with a distant electrical outlet. It is noted that outlet 74 must be disengaged from plug 22 before the reel can be wound or unwound.

While a preferred embodiment of the invention has been described herein, it should be apparent to those skilled in the art that other variations and modifications are possible without departing from the spirit of the invention.

It is claimed and desired to secure by Letters Patent:

1. A cord take-up reel for use on an electric lawn mower having a pair of laterally opposed handles comprising:
   a spool assembly having a pair of fixed shafts extending outwardly from opposite sides thereof along the rotational axis of said spool assembly, said spool assembly being adapted to take up and pay out an electric cord when said assembly is rotated in one direction or the other,
   mounting means on each of the laterally opposed handles for detachably and rotatably mounting an associated one of said shafts, and
   a crank pivotally attached to one of said shafts for selective positioning between a winding position wherein said crank may be freely moved to rotate said spool assembly, and a stowed position.

2. The reel of claim 1 further comprising crank engaging means for limiting the movement of said crank in its stowed position, thereby to limit the paying out of the electric cord.

3. The reel of claim 2 wherein said crank includes a handle, and wherein said crank engaging means includes a cradling member attached to said mounting means adjacent said crank for receiving said handle when said crank is in its stowed position.

4. The reel of claim 1 wherein said spool assembly includes two sections telescopically engaged to permit the axial dimension of said spool assembly to be selectively adjusted.

5. The reel of claim 1 wherein said mounting means includes a bracket assembly detachably mounted on an associated handle, said bracket assembly providing a semi-circular recess for rotatably mounting an associated shaft thereon.

6. The reel of claim 5 further comprising a locking plate pivotally mounted on said bracket assembly for selective positioning between closed and open positions wherein said shaft is locked and unlocked in said recess, respectively.

7. A cord take-up reel for use on an electric lawn mower having a pair of laterally opposed handles, said reel comprising:
   a telescopically adjustable spool assembly having a pair of fixed shafts extending outwardly from opposite sides thereof along its rotational axis, said spool assembly being adapted to take up or pay out an electric cord when said assembly is rotated in one direction or the other,
   a bracket assembly detachably mounted on each of the laterally opposed handles, said bracket assembly having a semi-circular recess for rotatably mounting an associated one of said shaft therein and a locking plate pivotally mounted on said bracket assembly for selective positioning between closed and open positions wherein said shaft is locked and unlocked in said recess, respectively,
   a crank pivotally attached to one of said shafts for selective positioning between a winding position wherein said crank may be freely moved to rotate said spool assembly, and a stowed position, and
   a stowing seat attached to said mounting means adjacent said crank, said stowing seat limiting the movement of the crank in its stowed position, thereby to limit the paying out of such electric cord.

* * * * *